United States Patent [19]
Cummins et al.

[11] B 3,986,576
[45] Oct. 19, 1976

[54] DIFFERENTIAL COUPLED PARKING BRAKE AND STEERING PUMP ASSEMBLY

[75] Inventors: Curtis F. Cummins, Decatur; Kenneth W. Kelly, Warrensburg; Harold N. Lantz, Decatur, all of Ill.

[73] Assignee: Caterpillar Tractor Co., Peoria, Ill.

[22] Filed: Dec. 18, 1974

[21] Appl. No.: 533,968

[44] Published under the second Trial Voluntary Protest Program on January 27, 1976 as document No. B 533,968.

Related U.S. Application Data
[62] Division of Ser. No. 398,387, Sept. 18, 1973, abandoned.

[52] U.S. Cl. .............................. 180/133; 74/15.69; 74/710.5; 192/4 A
[51] Int. Cl.² .......................................... B62D 5/06
[58] Field of Search ......... 180/79.2 R, 66 R, 53 FE, 180/53 D, 53 A, 53 R; 74/15.88, 15.69, 15.86, 710.5, 710; 192/4 A, 4 B; 188/170

[56] References Cited
UNITED STATES PATENTS

| | | | |
|---|---|---|---|
| 1,694,020 | 12/1928 | Price | 192/4 B |
| 3,323,389 | 6/1967 | Hause | 74/710.5 |
| 3,334,703 | 8/1967 | Zeller | 180/53 R |
| 3,334,711 | 8/1967 | Anderson | 192/4 B X |
| 3,363,728 | 1/1968 | Stengelin | 192/4 B X |
| 3,424,262 | 1/1969 | Kunz | 180/79.2 R |
| 3,500,970 | 3/1970 | Schilling | 188/170 |
| 3,532,177 | 10/1970 | Herrman | 180/66 R |
| 3,536,230 | 10/1970 | Williams | 188/170 |
| 3,547,234 | 12/1970 | Cummins | 188/170 |
| 3,642,103 | 2/1972 | Schott | 192/4 A |

*Primary Examiner*—M. H. Wood, Jr.
*Assistant Examiner*—John A. Pekar
*Attorney, Agent, or Firm*—Phillips, Moore, Weissenberger, Lempio & Strabala

[57] ABSTRACT

A parking brake assembly for applying braking force to a vehicular differential by means of an adjunctive pinion. The parking brake is pressure released and spring engaged to selectively lock the differential. An auxiliary steering pump is also associated with the differential by means of the adjunctive pinion such that the steering pump is driven by the adjunctive pinion. The parking brake assembly includes a plurality of friction discs and plates which are forcibly brought into and out of engagement for selectively applying or releasing the brake.

4 Claims, 2 Drawing Figures

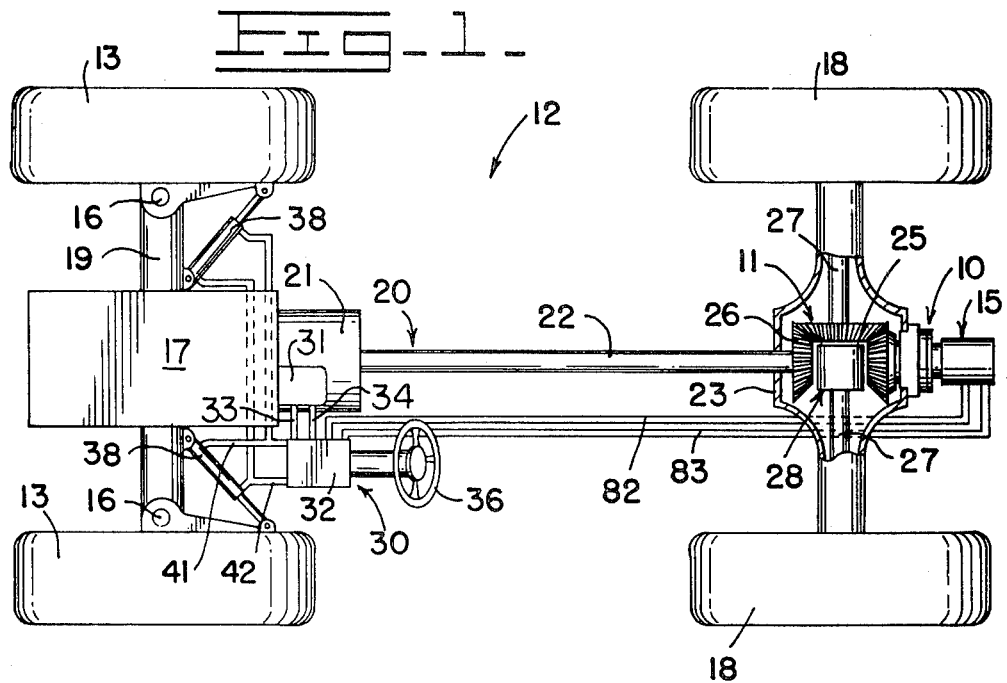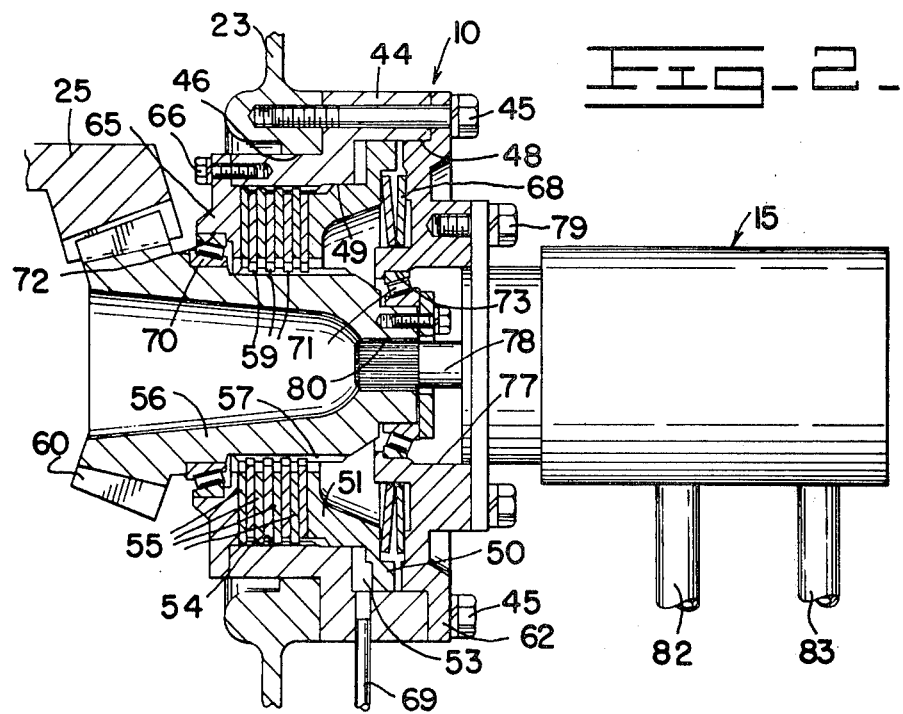

DIFFERENTIAL COUPLED PARKING BRAKE AND STEERING PUMP ASSEMBLY

This is a division of Ser. No. 398,387, filed Sept. 18, 1973, now abandoned.

BACKGROUND OF THE INVENTION

A vehicle, especially one used in earthmoving operations, is conventionally equipped with a parking brake which prevents movement of such vehicle when it is not operating and also acts as a safety device to provide means for stopping the vehicle in emergency situations wherein the main service brakes might fail.

A similar concern for safety indicates the propriety of a supplementary power supply for steering vehicles equipped with power steering systems such that steering capacity is maintained even in the event of a failure in the primary system. With both the steering and braking capacities sustained under all conditions, vehicular safety is vastly improved.

Prior art parking brake systems and supplemental steering devices have usually been separately disposed in the vehicle amongst the various other components thereof. In some arrangements, the vehicle drive train is equipped with the parking brake and in other instances the brake acts directly upon the wheels of the vehicle.

Similarly, auxiliary power means for vehicular steering systems have been disposed in various relatively inaccessable locations within the vehicle confines. Servicing of such conventional systems has generally required time cnsuming disconnections and burdensome disassemblies of portions of the power train or other vehicular system to gain access to the essential elements. Such inaccessability for servicing of prior art systems has been a vexing problem in the industry.

Some examples of related prior art systems are found in U.S. Pat. Nos. 3,407,894 and 3,424,262 to Thompson et al. and Kunz respectively.

SUMMARY AND OBJECTS OF THE INVENTION

The instant invention provides a readily removable easily serviceable parking brake and auxiliary steering supply assembly connected to a vehicular differential. The dual assembly is connected directly to the differential by means of an adjunctive pinion which mates with the output pinion of the differential for communication of torque thereto. The brake assembly includes friction disc and plate means which act upon the adjunctive pinion for selectively retarding same. The adjunctive pinion also acts directly drivingly upon the auxiliary steering pump to provide operation thereof with vehicular movement.

It is an object of this invention to provide a readily serviceable parking brake assembly which acts directly upon the differential unit of a vehicle.

It is another object of this invention to provide a readily serviceable auxiliary steering pump which is driven from the differential of the vehicle with which it is associated upon movement of the vehicle.

It is still another object of the invention to provide a friction disc type parking brake which acts directly upon an adjunctive pinion provided for mating directly with an output pinion of a vehicular differential.

It is also an object of this invention to provide a vehicular differential equipped with an adjunctive pinion which mates with readily serviceable and removable parking brake assembly and an auxiliary steering pump.

Other objects and advantages of the present invention will become apparent from the following description and drawing.

BRIEF DESCRIPTION OF THE DRAWING

FIG. 1 is a partially schematic plan view of a vehicle containing the instant parking brake assembly and auxiliary ground driven steering supply pump; and FIG. 2 is an enlarged cut-away elevation showing the adjunctive pinion of the present invention and its interrelation to the parking brake assembly and auxiliary steering supply pump.

DETAILED DESCRIPTION

With reference to FIG. 1 in the drawing, a vehicle is shown generally at 12 having a vehicular differential shown at 11, a parking brake assembly shown generally at 10, and an emergency or auxiliary steering pump is shown generally at 15. The vehicle is conventionally equipped with a pair of frontally disposed ground engaging wheels 13 steerably mounted upon a front axle 19 by means of king pins 16. The vehicle is also provided with an engine shown schematically at 17 for driving a pair of rearwardly disposed ground engaging drive wheels 18 through a power train 20, the specific details of which are not the subject of this invention. The power train includes generally a transmission 21 which is coupled to the engine for transmitting torque through a drive shaft 22 to an input pinion 26 of the differential 11.

The components of the differential are enclosed within a casing 23. A bevel output gear 25 is normally disposed within the casing in mating relation to the input pinion 26 and is driven thereby. A pair of opposed rear axles 27 are enclosed by the casing and are driven by the bevel gear 25 through standard differential gearing represented schematically at 28. In a conventional manner, the axles 27 transmit torque from the differential to the rear wheels 18.

The steering system is found generally at 30 within the vehicle. Such system has a primary pump 31 which is driven directly by the engine 17 of the vehicle. The primary pump conducts fluid under pressure to and from a steering control valve 32 by means of feed conduits 33 and 34. An operator controlled steering wheel 36 is provided for actuating the control valve 32 to direct fluid under pressure to or from a pair of hydraulic steering cylinders 38 via the reverse flow conduits 41 and 42. The steering cylinders are connected between the front axle 19 and each front wheel 13 for angular movement of the wheels about the king pins 16 to make the vehicle dirigible.

With reference to FIG. 2, the interrelation between the adjunctive pinion and brake and steering pump assemblies may be readily appreciated. The brake assembly 10 includes a housing 44 which is readily removably attached within an opening 46 of the differential casing 23 by means of bolts 45. In the preferred embodiment, the brake assembly is disposed within the rear end section of the differential casing in diametrically opposed relation to the drive shaft 22 and the input pinion 26. As is apparent from FIG. 1 of the drawing, this particular disposition facilitates servicing of the brake assembly by rendering it easily accessable from the rear of the vehicle and also protects such assembly from debris over which the vehicle might pass while moving forward. The brake assembly 10 may be readily removed from the differential casing without disturbing any of the other components of the power train by the simple removal of bolts 45.

It may be noted that the brake housing 44 is equipped with a pair of concentrically disposed bores 48 and 49 therein, the radially inwardly disposed bore being the bore 49. A stepped annular piston 50 is axially slideably disposed within the bores 48 and 49 and the piston portion 51 is disposed within the bore 49. With the stepped piston mounted within the bores, an annular chamber 53 is formed thereby with the brake housing 44.

Spline means 54 are formed within the inner bore 49 and axially slidably mounted upon such spline means are a plurality of friction discs 55. In a similar manner an elongated sleeve portion 56, which is a part of an adjunctive pinion 60, is equipped with external spline means 57 for axially slideably mounting a second group of interleaved friction plates 59. The adjunctive pinion is bevelled and is formed integrally with the sleeve portion 56 and, when disposed within the differential casing, meshes directly with the splines of the output gear 25.

The brake assembly 10 is further provided with a cover member 62 which, when bolted to the casing 23 by means of bolts 45, sandwiches the brake housing 44 against the differential casing. A reaction member 65 is mounted upon a portion of the housing 44 and extends within the differential casing 23. Such member is attached to the housing by means of the bolts 66 and is adapted to engage the leftwardmost end portion of the plurality of the interleaved friction discs 55. The opposite end portion of the friction plate grouping is engaged by the portion 51 of the stepped piston 50. A pair of back-to-back disposed conical spring washers 68 are mounted between the cover member 62 and the piston 50 to normally bias the friction discs 55 and plates 59 and the stepped piston 50 into engagement with the reaction member 65 so as to prevent relative rotation between the discs and plates and to prevent the associated adjunctive pinion 60 from rotating. Of course, prevention of rotation of the adjunctive pinion 60 also prevents rotation of the meshed output gear 25 and causes braking of the vehicle.

The normally spring applied brake assembly 10 is selectively released by communicating, via suitable communication means, pressurized fluid to the feed conduit 69 and annular chamber 53. Such pressurization of the chamber 53 causes the piston 50 to shift rightwardly against the bias of spring washers 68 to compress such washers and release the clamping pressure on the interleaved friction discs and plates to permit the plates 59 and adjunctive pinion 60, attached thereto, to rotate. With the adjunctive pinion 60 freely rotatable, the output pinion 25 is also rotatable under the influence of the input pinion 26 in the normal manner. Of course, when pressurized fluid is released from chamber 53 for any reason, the spring washers 68 automatically instantaneously expand to restore the brake assembly to its normally engaged disposition.

While the vehicle is operating under normal conditions the chamber 53 will be held in constant communication with a source of pressurized fluid by, for example, connection with the hydraulic system of the vehicle. However, upon a failure of the pressure in such system, fluid supply to the chamber 53 will be discontinued and the instant parking brake assembly will be automatically engaged to stop the vehicle.

A pair of bearing means 70 and 71 are suitably disposed within portions of the brake assembly for rotatably journalling the adjunctive pinion 60. Such bearings are received within bores 72 and 73 within the reaction member 65 and the cover member 62, respectively.

The ground driven auxiliary steering pump 15 of the present invention is also adapted for rotational connection with a portion of the adjunctive pinion 60 as may be readily appreciated by reference to FIG. 2 in the drawing. The cover member 62 is provided with an opening 77 for receiving a splined end portion of the steering pump input shaft 78. A plurality of bolts 79 are suitably disposed around the periphery of the opening 77 for securely mounting the pump therein.

The sleeve portion 56 of the adjunctive pinion 60 is also equipped with an internally splined opening 80 which engages the external splines on the end of the input shaft 78 such that the pump 15 is driven upon normal rotation of the driving wheels 18, output gear 25, and adjunctive pinion 60. Upon rotation, the wheels cause the pump to supply pressurized fluid via the conduits 82 and 83 to the steering control valve 32 to provide a supplementary source for the steering system which is readily available for use in the event that the primary steering source fails or becomes inoperative for any reason. Of course, at such times as a supplemental source is not necessary, excess pressure fluid may be readily relieved by any suitable means such as by-pass valving or the like.

In view of the foregoing, it should be apparent that the present invention provides a vastly improved and efficiently serviceable parking brake assembly and auxiliary steering pump which are conveniently connected with the differential of a vehicle. The instant invention makes removal and servicing of the essential components extremely quick and inexpensive.

While the invention has been described with particular reference to the preferred embodiments, it is apparent that variations and modifications are possible within the purview of the inventive concepts. One such modification, for example, would be to interconnect the auxiliary pump 15 not only with the steering system, but with the parking brake 10 as well. Consequently, in an emergency situation, the operator would then be able to selectively control the application of the parking brake, as well as steer the vehicle, in order to maneuver the vehicle off the road onto the shoulder in a safe, controlled manner. No limitation with respect to such variations and modifications is intended, except by the scope of the appended claims.

We claim:

1. In a vehicle having differential means for transmitting engine torque to ground engaging wheels and having fluid actuated primary steering means; auxiliary steering fluid supply means for supplying fluid under pressure to said steering means in response to rotation of said ground engaging wheels, said steering fluid supply means including adjunctive pinion means for directly engaging an operative component of said differential means and for causing said differential means to drive said auxiliary steering fluid supply means upon rotation of said ground engaging wheels, parking brake assembly means having means for directly acting upon said adjunctive pinion means to selectively permit or restrain rotation of said adjunctive pinion means to respectively permit or prevent said differential means component from rotating and allowing rotation of said ground engaging wheels, said parking brake assembly means including a first plurality of friction plates connected to a portion of said adjunctive pinion means, and a second plurality of friction discs selectively engageable with said first plurality of friction plates for permitting or restraining movement thereof.

2. The invention of claim 1 wherein said auxiliary steering fluid supply means include a rotary fluid pump having a drive shaft, said drive shaft having a portion directly engaging and rotatable with a portion of said adjunctive pinion means.

3. The invention of claim 2 wherein said drive shaft portion has spline means thereon for engaging corresponding spline means on said adjunctive pinion means portion and wherein said drive shaft portion of said fluid pump is releasably held in operative engagement with said adjunctive pinion means portion by bolt means.

4. The invention of claim 1 wherein said differential means include a casing fixed to said vehicle for containing differential means components, said parking brake assembly means and said auxiliary steering fluid supply means including said adjunctive pinion means being readily removable attached to said casing by means of threaded fastening means.

* * * * *